United States Patent
Jeong et al.

(10) Patent No.: US 8,861,865 B2
(45) Date of Patent: Oct. 14, 2014

(54) METHOD AND APPARATUS FOR SEARCHING FOR IMAGE

(75) Inventors: Jin-guk Jeong, Yongin-si (KR); Hui Miao, Suwon-si (KR); Soo-hong Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 873 days.

(21) Appl. No.: 13/012,996

(22) Filed: Jan. 25, 2011

(65) Prior Publication Data

US 2011/0182518 A1   Jul. 28, 2011

(30) Foreign Application Priority Data

Jan. 26, 2010   (KR) .................. 10-2010-0007076

(51) Int. Cl.
*G06K 9/46*        (2006.01)
*G06F 17/30*       (2006.01)

(52) U.S. Cl.
CPC .... *G06F 17/30265* (2013.01); *G06F 17/30247* (2013.01)
USPC ........................................ 382/190

(58) Field of Classification Search
CPC ................ G06F 17/30613; G06F 17/30247; G06K 9/46
See application file for complete search history.

(56) References Cited

U.S. PATENT DOCUMENTS

2010/0027834 A1* 2/2010 Spitzig et al. ................. 382/100
2010/0082709 A1* 4/2010 Yamamoto .................... 707/812

* cited by examiner

*Primary Examiner* — Stephen R Koziol
*Assistant Examiner* — Elisa Rice
(74) *Attorney, Agent, or Firm* — Sughrue Mion, PLLC

(57) ABSTRACT

A method and apparatus for searching for an image are provided. The method includes: determining whether a unique identifier exists in metadata of an input image to be searched for; when the unique identifier exists in the metadata, searching for an original image of the input image in a target device by using the unique identifier; when the unique identifier does not exist in the metadata, extracting a characteristic value of the input image; and when the unique identifier does not exist in the metadata, searching for the original image by comparing the extracted characteristic value with one or more characteristic values of one or more images stored in the target device.

18 Claims, 4 Drawing Sheets

FIG. 5

|  | FILE NAME | UNIQUE IDENTIFIER (UUID) |
|---|---|---|
| DEVICE 1 | DSC0801 | 550e8400-e29b-41d4-a716-446655440000 |
|  | DSC0802 | 461a7283-c93d-53a2-b824-557766880000 |
|  | . . . | . . . |
| DEVICE 2 | DSC1213 | 183f84520b81c-63d3-c825-125476890000 |
|  | DSC1214 |  |
|  | . . . | . . . |
| . . . | . . . | . . . |

METHOD AND APPARATUS FOR SEARCHING FOR IMAGE

CROSS-REFERENCE TO RELATED PATENT APPLICATION

This application claims priority from Korean Patent Application No. 10-2010-0007076, filed on Jan. 26, 2010 in the Korean Intellectual Property Office, the disclosure of which is incorporated herein in its entirety by reference.

BACKGROUND

1. Field

Apparatuses and methods consistent with exemplary embodiments relate to searching for an image, and more particularly, to searching for an original image of an image by using metadata or a characteristic value of the image.

2. Description of the Related Art

Due to developments in computers and communication technologies, there is an increasing demand for multimedia information services. Also, due to developments in information technology (IT) fields, the Internet, digital cameras, mobile phones, and the like, when compared to earlier forms of mass media, allow ordinary people that are not in professional groups to be able to quickly create a plurality of pieces of meaningful information. Thus, new communication forms are being created to allow ordinary people to share their own contents with other users.

Contents may be shared between users connected via a network in various ways, such as by web pages having bulletins, blogs, and webzines. In general, contents that are provided via a web page are transcoded or resized to have a form appropriate for the web page, and then are provided to other users via a network. For example, when a user provides a user-taken picture via a blog, the user reduces a size of the user-taken picture to obtain an edited picture and then provides the edited picture via the blog.

Contents shared between users are usually different from original contents since the contents are edited and converted according to needs of each user to share the contents. Thus, there is an inconvenience in that a user who wants to use the original contents may not easily use the original contents. Accordingly, there is an increasing demand for a technology by which a user may efficiently search for information having user-desired contents from among various types of multimedia contents including video, audio, voice, and still images, and may change the information to a user-desired form or may transmit the information.

SUMMARY

One or more exemplary embodiments provide a method and apparatus for searching for an image, whereby a user may search for an original image of an image by using a unique identifier of metadata that is not changed during image editing and conversion, or in a case where the unique identifier does not exist, the user may search for the original image in another device, by using a characteristic value of the image.

According to an aspect of an exemplary embodiment, there is provided a method of searching for an image, the method including: determining whether a unique identifier exists in metadata of an input image to be searched for; when the unique identifier exists in the metadata of the input image; searching for an original image of the input image in a target device by using the unique identifier; when the unique identifier does not exist in the metadata of the input image, extracting a characteristic value of the input image; and when the unique identifier does not exist in the metadata of the input image, searching for the original image by comparing the extracted characteristic value with one or more characteristic values of one or more images stored in the target device.

According to an aspect of another exemplary embodiment, there is provided an image searching apparatus including: a metadata read unit which determines whether a unique identifier exists in metadata of an input image to be searched for; a characteristic value extracting unit which extracts a characteristic value of the input image when the unique identifier does not exist in the metadata of the input image; and an image searching unit which searches for an original image of the input image in a target device by using the unique identifier when the unique identifier exists in the metadata of the input image, and when the unique identifier does not exist in the metadata of the input image, searches for the original image by comparing the characteristic value with one or more characteristic values of one or more images stored in the target device.

According to an aspect of another exemplary embodiment, there is provided an image searching system including: a target device storing, in a storage device, one or more images; and an image searching apparatus comprising an image searching unit which searches for an original image of an input image in the target device by using a unique identifier of the input image when the unique identifier exists in metadata of the input image, and searches for the original image by comparing an extracted characteristic value of the input image with one or more characteristic values of the one or more images stored in the target device when the unique identifier does not exist in the metadata of the input image, wherein the storage device is an internal storage device of the target device or an external storage device.

BRIEF DESCRIPTION OF THE DRAWINGS

The above and/or other aspects will become more apparent by describing in detail exemplary embodiments with reference to the attached drawings in which:

FIG. 5 is a diagram of an example of an image information database in FIG. 2.

DETAILED DESCRIPTION OF EXEMPLARY EMBODIMENTS

Hereinafter, exemplary embodiments will be described in detail with reference to the attached drawings. Expressions such as "at least one of," when preceding a list of elements, modify the entire list of elements and do not modify the individual elements of the list.

Figure 1:
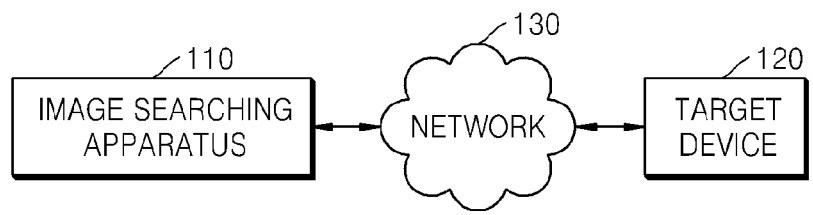
FIG. 1 is a diagram of an image searching system according to an exemplary embodiment.

FIG. 1 is a diagram of an image searching system according to an exemplary embodiment.

Referring to FIG. 1, the image searching system includes an image searching apparatus 110 and a target device 120 connected to each other via a network 130. The image searching apparatus 110 searches for an original image of an input image in the target device 120 connected to the image searching apparatus 110 via the network 130. Although FIG. 1 illustrates only one target device 120, another exemplary embodiment is not limited thereto and a plurality of the target devices 120 may exist.

The image searching apparatus 110 and the target device 120 may include various devices that support various wired and wireless networks, and examples of the various devices are Portable Multimedia Players (PMPs), Ultra Mobile Personal Computers (UMPCs), notebooks, mobile phones, digital cameras, Personal Computers (PCs), and the like. In particular, the target device 120 is a storage device storing an original image, and in general, may be a storage device including a Network Attached Storage (NAS) that is accessible via a network or may be a web server in which an original image of an image provided to a web-page is stored. Moreover, the target device 120 may be a device connected to an external storage device. Also, the image searching apparatus 110 and the target device 120 may be client devices configuring a home network system connected to a control device including a home gateway or a home server. For example, the image searching apparatus 110 and the target device 120 may be devices for sharing an image by being mutually connected via the network 130 according to the Digital Living Network Alliance (DLNA) standard used to control information home appliances in a house.

Also, the network 130 may include at least one of a local area network (LAN), a wide area network (WAN), a wireless Internet method including Bluetooth, Wi-Fi, WiBro, Ultra Wide Band (UWB), or the like, and a wired Internet method including Institute of Electrical and Electronics Engineers (IEEE) 1394, Ethernet, and the like.

Figure 2:
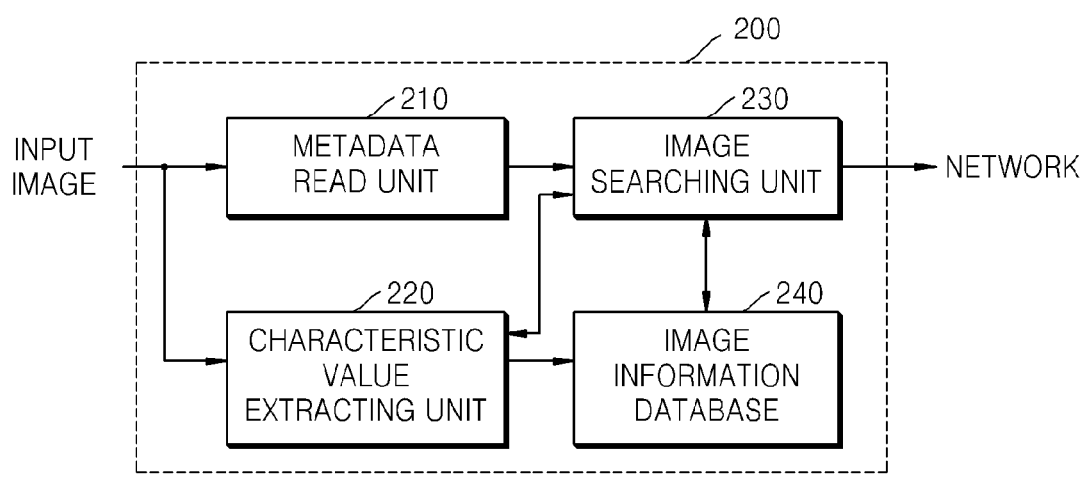
FIG. 2 is a block diagram of a configuration of an image searching apparatus according to an exemplary embodiment.

FIG. 2 is a block diagram of a configuration of an image searching apparatus 200 according to an exemplary embodiment.

Referring to FIG. 2, the image searching apparatus 200 includes a metadata read unit 210, a characteristic value extracting unit 220, an image searching unit 230, and an image information database 240.

When an input image to be searched for is input, the metadata read unit 210 reads metadata of the input image and determines whether a unique identifier exists in the metadata.

Figure 3:
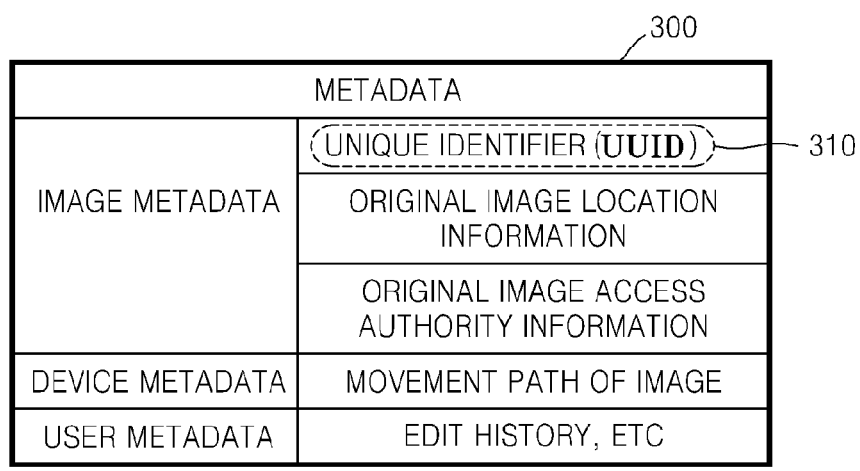
FIG. 3 is a diagram of metadata of an image according to an exemplary embodiment.

FIG. 3 is a diagram of metadata 300 of an image according to an exemplary embodiment.

Referring to FIG. 3, the metadata 300 includes image metadata, device metadata, and user metadata.

The image metadata may include a unique identifier 310, original image location information, and original image access authority information.

The unique identifier 310 is inserted into a corresponding area of the metadata 300 when the image is generated, and as an example of the unique identifier 310, it is possible to use a data type referred to as a Universally Unique Identifier (UUID).

The UUID is a 16-byte (128-bit) number, and the number of theoretically possible UUIDs is about $3 \times 10^{38}$. The UUID includes 32 hexadecimal digits that are displayed in the form 8-4-4-4-12, separated by hyphens. For example, the UUID may have a value of "550e8400-e29b-41d4-a716-446655440000." The UUID may be generated by using any one of various methods including an MAC address-based method, a time-based method, a title-based method, a random number-based method, and the like. In more detail, the MAC address-based method involves generating the UUID by using a MAC address of a device in which an original image is generated, the time-based method involves generating the UUID by measuring an original image generation time with respect to predetermined nanosecond-time intervals, and the title-based method involves converting a title of the original image into hexadecimal digits and then generating the UUID by using the hexadecimal digits. The random number-based method involves generating the UUID by arbitrarily generating a hexadecimal-digit random number.

In a case where the UUID is used as the unique identifier 310, as described above, the number of theoretically possible UUIDs is about $3 \times 10^{38}$ and thus almost all content may have its own UUID. The unique identifier 310 is not changed while the original image is edited, copied, and converted, and maintains its unique value in the corresponding area of the metadata 300.

Figure 4:
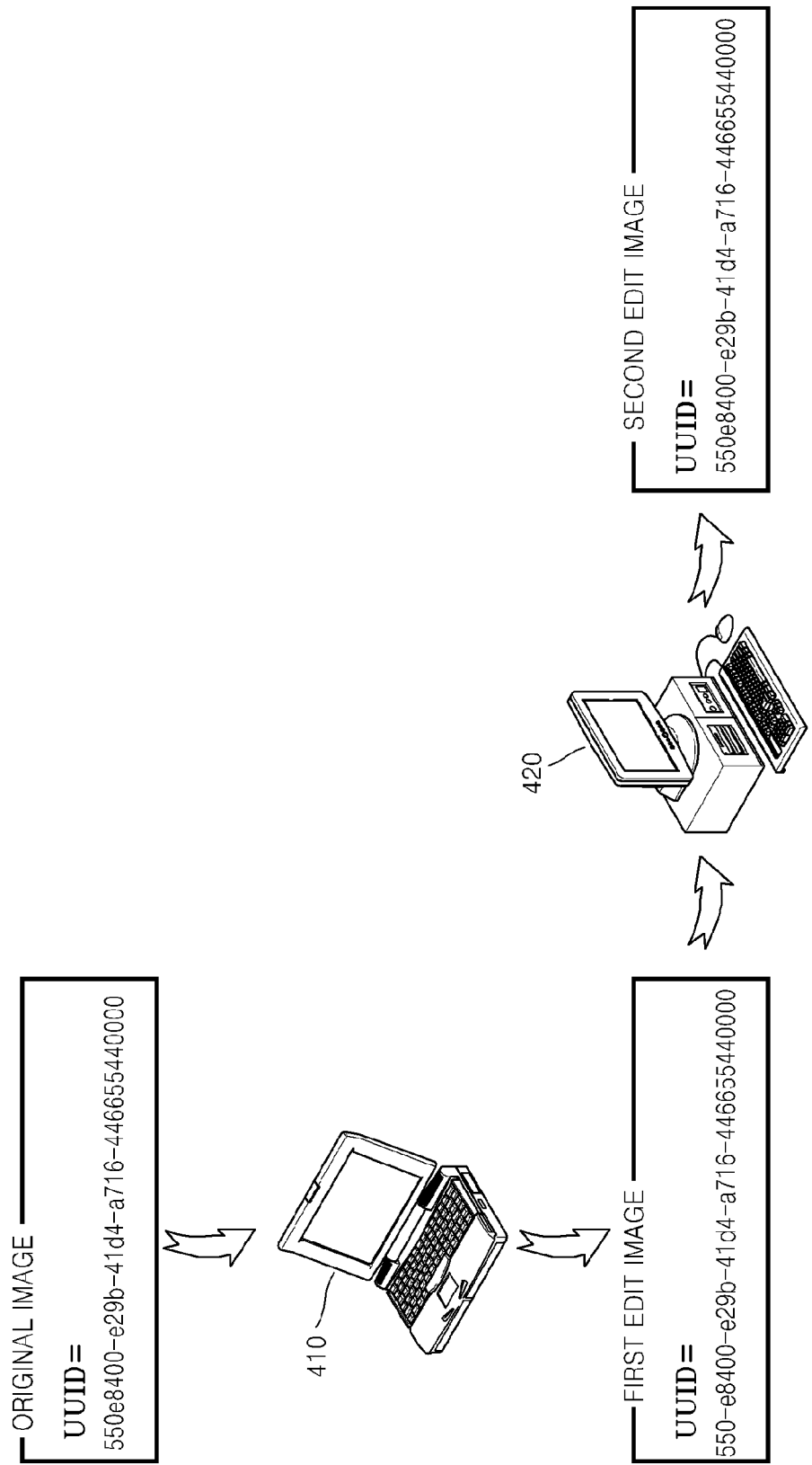
FIG. 4 is a diagram for describing features of a unique identifier included in metadata of an image according to an exemplary embodiment.

FIG. 4 is a diagram for describing features of a unique identifier included in metadata of an image according to an exemplary embodiment.

Referring to FIG. 4, an exemplary unique identifier (for example, UUID) stored in metadata of an original image has a value of "550e8400-e29b-41d4-a716-446655440000." In this regard, when the original image is stored in a first device 410, such as a PC, edited, and then converted to generate a first edit image, a unique identifier (for example, a UUID) stored in metadata of the first edit image has a value of "550e8400-e29b-41d4-a716-446655440000," that is, the same value as the UUID of the original image. Also, when the first edit image is copied to and stored in a second device 420, and then is edited and converted to generate a second edit image, a unique identifier (for example, a UUID) stored in metadata of the second edit image also has a value of "550e8400-e29b-41d4-a716-446655440000," that is, the same value as the UUID of the original image. As described above, a unique identifier stored in metadata of an image has a unique value that is not changed while the image is edited and then converted, and while the image is copied and then moved between devices. Thus, by using the unique identifier, it is possible to trace and search for images derived from the original image.

Referring back to FIG. 3, the original image location information indicates location information of the target device 120 storing an original image, and may be in the form of a Universal Resource Locator (URL). For example, the original image location information may include a path where a protocol and original information are stored, and may be expressed in the form of "protocol://a location of a target device storing an original image." For example, in a case where a location of the target device 120 is "http://www.samsung.com/private_contents," information about the URL may be added to the metadata 300, as the original image location information.

The original image access authority information prevents the original image from being shared between random users. For example, if the original image location information is encrypted, the original image access authority information may be encryption-key information for decrypting the encrypted original image location information.

In a case where an image is transmitted between different devices, the device metadata includes information about a transmission history detail of the image. For example, when an image is transmitted from a first device Device ID=1 to a third device Device ID=3 via a second device Device ID=2, metadata of an image stored in the third device may include ID information of the first and second devices, and thus a movement path of the image may be indicated. In this manner, via the device metadata, it is possible to trace an image transmission path, and a flow of illegal image use.

The user metadata includes edit history and account information. The edit history includes information about edit details of a changed image. For example, in a case of a resized image, edit history metadata may include information about size information of an original image, and change details (e.g., details regarding brightness, white noise, and the like) with respect to the original image. In addition, the user metadata may include the account information indicating identification information of a user that has provided an image. For example, in a case of an image that is provided to a specific web bulletin, the account information may be identification information of a user that had uploaded the image to the web bulletin.

Referring back to FIG. 2, in a case where the unique identifier exists in the metadata, the image searching unit 230 searches for the original image in the target device 120 by using the unique identifier. In more detail, the image searching unit 230 may search for an image having the same unique identifier as the input image from among images stored in the target device 120 connected to the image searching apparatus 200 via a network 130, and may determine that a found image having the same unique identifier is the original image. In a case where the original image is copied and transmitted between a plurality of target devices, images having the same unique identifier as the original image may be detected in the plurality of target devices. In this case, from among the images having the same unique identifiers as the original image, which are detected in the plurality of target devices, the image searching unit 230 may determine that an image having the highest resolution from among the images is the original image, though it is understood that another exemplary embodiment is not limited thereto. For example, the image searching unit 230 according to another exemplary embodiment may determine which image is the original image by referring to at least one of the original image location information and the transmission history detail information, which is included in the metadata 300 described above.

Also, the image searching unit 230 may search for the original image having the same unique identifier as the input image, by using image data information included in the image information database 240 and stored in target devices connected to the image search apparatus 200 via the network 130. Unique identifiers of images stored in the target devices connected to the image searching apparatus 200 via the network may be previously stored in the image information database 240 of the image searching apparatus 200. The image information database 240 may be controlled by a control unit (not shown) and may be updated at predetermined time intervals by monitoring a change in a state of each target device connected to the image search apparatus 200 via the network.

FIG. 5 is a diagram of an example of the image information database 240 of FIG. 2.

Referring to FIG. 5, the image information database 240 may include a file name and unique identifier information of images stored in one or more target devices connected to the image searching apparatus 200 via the network. In a case where the image information database 240 is configured as illustrated in FIG. 5, and a unique identifier stored in metadata of an input image has a value of "550e8400-e29b-41d4-a716-446655440000," the image searching unit 230 may search the image information database 240 and determine that a file stored in a device 1 and having a file name of "DSC0801" is an image file having the same unique identifier as the input image. The image searching unit 230 may compare the resolution of the "DSC0801" file stored in the device 1 with the resolution of the input image and may determine that the "DSC0801" file is an original image when the resolution of the "DSC0801" file in the device 1 is higher than that of the input image, or may determine that the "DSC0801" file is the original image when location information of the original image obtained from original image location information of the metadata matches location information of the device 1. Also, the image searching unit 230 may determine whether the "DSC0801" file in the device 1 is the original image having the unique identifier having a value of "550e8400-e29b-41d4-a716-446655440000" by using transmission history detail information of the metadata.

As described above, the image searching apparatus 200 may facilitate the searching for an original image and an image derived from the original image, by using a unique identifier that has a unique value stored in metadata of the images.

Meanwhile, in a case of an image file that is uploaded to a web page or a blog, metadata of an original image may be deleted or changed in an upload server. In this case, a unique identifier stored in the metadata is also deleted or changed and thus it may not be possible to locate the original image. For example, in a case where a unique identifier does not exist in metadata, the image searching apparatus 200 may extract a characteristic value of an input image, and search for an image that has a value that is the same as or similar to the extracted characteristic value in a target device.

Referring back to FIG. 2, in a case where a unique identifier does not exist in metadata of an input image, the characteristic value extracting unit 220 extracts one or more characteristic values of the input image.

Since image data may be configured in various formats, and since a plurality of pieces of image data may exist, a content description of image data may be used to efficiently search for an image. For a content description of image data, the characteristic value extracting unit 220 may extract a characteristic value of an input image by using a fingerprinting method or by using one of various image characteristic extracting methods used in Moving Picture Experts Group-7 (MPEG-7). In more detail, the characteristic value extracting unit 220 may determine the characteristic value of the input image by using at least one of: a color histogram indicating a characteristic with respect to colors; a Garbor Wavelet coefficient indicating a characteristic with respect to textures; a boundary area descriptor indicating a characteristic with respect to shapes; a characteristic vector using Scale Invariant Feature Transform (SIFT); and an edge component histogram indicating an edge characteristic. In addition, the characteristic value extracting unit 220 may extract the characteristic value of the input image by using the Radon transform that is a Directional Filter Bank (DFB) based on a human visual characteristic.

Also, the characteristic value extracting unit 220 may transform the input image into a frequency domain by performing a Discrete Cosine Transform (DCT) on the input image, and may extract the characteristic value of the input image by using a DCT coefficient of the input image transformed into the frequency domain.

The image searching unit 230 may compare characteristic values of images stored in the target device 120 with the characteristic value of the input image, and may determine that an image having a value equal or similar to the characteristic value is the original image. The characteristic values of the images stored in the target device 120 may be databased and may be previously stored in the image information database 240 in a manner similar to unique identifiers of the images stored in the target device 120, which are described above. In this case, the image searching unit 230 may compare the characteristic value of the input image with the characteristic values of the images of the target device 120 which are stored in the image information database 240, and may search for the original image accordingly.

Figure 6:
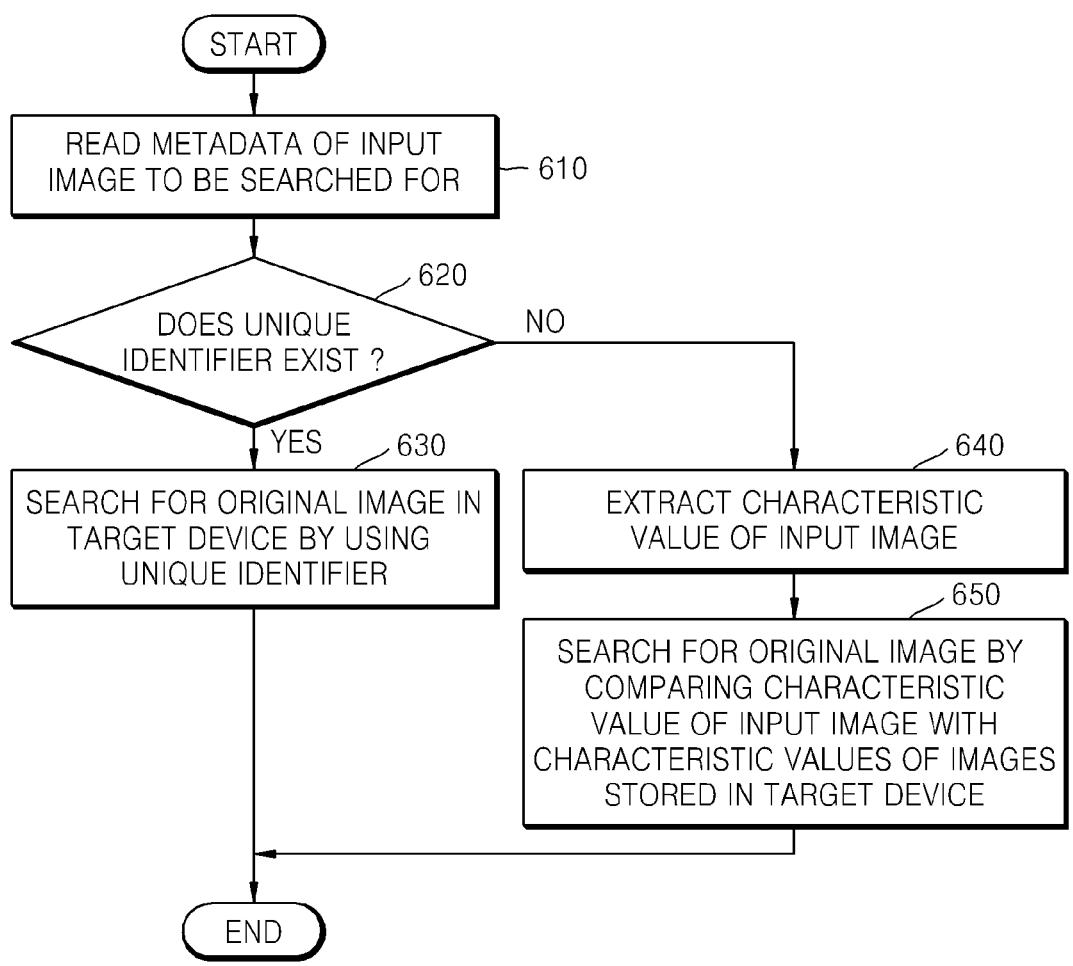
FIG. 6 is a flowchart of a method of searching for an image, according to an exemplary embodiment.

FIG. 6 is a flowchart of a method of searching for an image, according to an exemplary embodiment.

Referring to FIG. 6, in operation 610, the metadata read unit 210 reads metadata of an input image to be searched for.

In operation 620, the metadata read unit 210 determines whether a unique identifier exists in the metadata of the input image, and when the unique identifier exists, the metadata read unit 210 outputs the unique identifier of the input image to the image searching unit 230.

In operation 630, as a result of the determination in operation 620, if the unique identifier of the input image exists, the image searching unit 230 searches for an original image in a target device, wherein the original image has the same unique identifier as the input image. As described above, in a case where a plurality of derivative images are generated from the original image, the derivative images having the same unique identifier may be dispersed and stored in different devices. Thus, in a case where a plurality of images having the same unique identifier exist, the image searching unit 230 may determine that an image having the highest definition is the original image by comparing the resolutions of the images, or may determine the original image by referring to at least one of original image location information and transmission history detail information included in the metadata of the input image.

In operation 640, as a result of the determination in operation 620, when the unique identifier does not exist in the metadata of the input image, the characteristic value extracting unit 220 extracts a characteristic value of the input image. As described above, the characteristic value extracting unit 220 may extract the characteristic value of the input image by using at least one of a finger-printing method, a color histogram indicating a characteristic with respect to colors, a Garbor Wavelet coefficient indicating a characteristic with respect to textures, a boundary area descriptor indicating a characteristic with respect to shapes, a characteristic vector using SIFT, an edge component histogram indicating an edge characteristic, and a DCT coefficient.

In operation 650, as a result of the determination in operation 620, when the unique identifier does not exist in the metadata of the input image, the image searching unit 230 compares the extracted characteristic value of the input image with characteristic values of images stored in the target device, and determines an image having a characteristic value most similar to the characteristic value of the input image, from among the images in the target device.

According to the one or more exemplary embodiments, it is possible to conveniently access an original image by using metadata of an image. Also, even if metadata does not exist, it is possible to search for the original image by using a characteristic of the image. In addition, according to one or more exemplary embodiments, it is possible to store a resized small picture in a mobile device or a digital camera having a small display, and then to search for an original image having high definition so as to watch the original image on a TV with a large display or to print the original image by using a printer, so that an image appropriate for an operation of a device may be provided while the original image having high definition may also be provided when desired.

Exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method of searching for an image, the method comprising:
   determining whether a unique identifier exists in metadata of an input image to be searched for;
   when the unique identifier exists in the metadata, searching for an original image of having a same unique identifier with the input image in a target device;
   when the unique identifier does not exist in the metadata, extracting a characteristic value of the input image, and searching for the original image by comparing the extracted characteristic value with one or more characteristic values of one or more images stored in the target device,
   wherein the input image is an image edited or converted from the original image such that the input image is different from the original image, and the unique identifier has a unique value that is not changed while the original image is edited or converted.

2. The method of claim 1, wherein the unique identifier comprises a Universally Unique Identifier (UUID).

3. The method of claim 1, wherein the extracting the characteristic value comprises extracting the characteristic value using a finger-printing method.

4. The method of claim 1, wherein the extracting the characteristic value comprises:
   transforming the input image into a frequency domain by performing a Discrete Cosine Transform (DCT) on the input image; and
   extracting the characteristic value of the input image by using a DCT coefficient of the input image transformed into the frequency domain.

5. The method of claim 1, wherein the extracting the characteristic value comprises extracting the characteristic value using at least one of: a color histogram indicating a characteristic with respect to colors; a Garbor Wavelet coefficient indicating a characteristic with respect to textures; a boundary area descriptor indicating a characteristic with respect to shapes; a characteristic vector using Scale Invariant Feature Transform (SIFT); and an edge component histogram indicating an edge characteristic.

6. The method of claim 1, wherein one or more unique identifiers and the one or more characteristic values of the one or more images stored in the target device are previously stored in a database.

7. The method of claim 6, wherein:
   the searching for the original image by comparing the extracted characteristic value with the one or more characteristic values comprises using the one or more unique identifiers and the one or more characteristic values stored in the database to search for the original image; and
   the one or more unique identifiers and the one or more characteristic values are of the one or more images that are stored in the target device.

8. The method of claim 1, wherein the searching for the original image of the input image in the target device by using the unique identifier comprises:

when a plurality of images having the unique identifier exist in one or more target devices, determining an image having a highest resolution, from among the plurality of images, as the original image.

9. The method of claim 1, wherein the searching for the original image of the input image in the target device by using the unique identifier comprises:
when a plurality of images having the unique identifier exist in one or more target devices, determining an image, from among the plurality of images, as the original image based on at least one of original image location information and transmission history detail information comprised in the metadata of the input image.

10. A non-transitory computer readable recording medium having recorded thereon a program for executing the method of claim 1.

11. An image searching apparatus comprising:
a metadata read unit which determines whether a unique identifier exists in metadata of an input image to be searched for;
a characteristic value extracting unit which extracts a characteristic value of the input image when the unique identifier does not exist in the metadata; and
an image searching unit which searches for an original image having a same unique identifier with the input image in a target device when the unique identifier exists in the metadata, and when the unique identifier does not exist in the metadata, searches for the original image by comparing the extracted characteristic value with one or more characteristic values of one or more images stored in the target device,
wherein the input image is an image edited or converted from the original image such that the input image is different from the original image, and the unique identifier has a unique value that is not changed while the original image is edited or converted.

12. The image searching apparatus of claim 11, wherein the unique identifier comprises a Universally Unique Identifier (UUID).

13. The image searching apparatus of claim 11, wherein the characteristic value extracting unit extracts the characteristic value by using a finger-printing method.

14. The image searching apparatus of claim 11, wherein the characteristic value extracting unit transforms the input image into a frequency domain by performing a Discrete Cosine Transform (DCT) on the input image, and extracts the characteristic value of the input image by using a DCT coefficient of the input image transformed into the frequency domain.

15. The image searching apparatus of claim 11, wherein the characteristic value is extracted by using at least one of: a color histogram indicating a characteristic with respect to colors; a Garbor Wavelet coefficient indicating a characteristic with respect to textures; a boundary area descriptor indicating a characteristic with respect to shapes; a characteristic vector using Scale Invariant Feature Transform (SIFT); and an edge component histogram indicating an edge characteristic.

16. The image searching apparatus of claim 11, further comprising an image information database which stores one or more unique identifiers and one or more characteristic values of the one or more images stored in the target device.

17. The image searching apparatus of claim 16, wherein:
the image searching unit uses the one or more unique identifiers and the one or more characteristic values stored in the image information database to search for the original image; and
the one or more unique identifiers and the one or more characteristic values are of the one or more images that are stored in the target device.

18. An image searching system comprising:
a target device storing, in a storage device, one or more images; and
an image searching apparatus comprising an image searching unit which searches for an original image having a same unique identifier with an input image in the target device when the unique identifier exists in metadata of the input image, and searches for the original image by comparing an extracted characteristic value of the input image with one or more characteristic values of the one or more images stored in the target device when the unique identifier does not exist in the metadata of the input image,
wherein the storage device is an internal storage device of the target device or an external storage device, and
wherein the input image is an image edited or converted from the original image such that the input image is different from the original image, and the unique identifier has a unique value that is not changed while the original image is edited or converted.

* * * * *